United States Patent [19]
Blaeser et al.

[11] Patent Number: 5,198,945
[45] Date of Patent: Mar. 30, 1993

[54] MAGNETIC HEAD SUSPENSION

[75] Inventors: David J. Blaeser; Ryan A. Jurgenson; Brent Lien, all of Hutchinson, Minn.

[73] Assignee: Hutchinson Technology Incorporated, Hutchinson, Minn.

[21] Appl. No.: 612,012

[22] Filed: Nov. 9, 1990

[51] Int. Cl.$^5$ .............................................. G11B 5/48
[52] U.S. Cl. ................................................. 360/104
[58] Field of Search ........................ 360/104; 29/603

[56] References Cited

U.S. PATENT DOCUMENTS

| | | | |
|---|---|---|---|
| 4,268,879 | 5/1981 | Watrous | 360/104 |
| 4,286,297 | 8/1981 | Root et al. | 360/103 |
| 4,843,502 | 6/1989 | Tagawa | 360/105 |
| 4,853,811 | 8/1989 | Brooks | 360/104 X |
| 4,853,813 | 8/1989 | Yamanouchi | 360/104 |
| 4,894,740 | 1/1990 | Chhabra et al. | 360/103 |
| 4,896,233 | 1/1990 | Yamada | 360/104 |
| 4,943,875 | 7/1990 | Reidenbach | 360/104 |
| 4,947,275 | 8/1990 | Hinlein | 360/104 |
| 4,992,898 | 2/1991 | Wanlass | 360/104 |
| 5,012,369 | 4/1991 | Owe et al. | 360/104 |
| 5,014,144 | 5/1991 | Sato et al. | 360/104 |
| 5,065,271 | 11/1991 | Matsuura | 360/104 |

*Primary Examiner*—A. J. Heinz

[57] ABSTRACT

An improved magnetic head suspension having a unitary load beam and flexure structure with a gimballed slider baseplate etched into the slider.

9 Claims, 3 Drawing Sheets

MAGNETIC HEAD SUSPENSION

BACKGROUND OF THE INVENTION

The present invention is an improved magnetic head suspension (HSA) for use with dynamic magnetic storage devices or rigid disk drives. More specifically, it is a head suspension assembly (HSA) that has improved gimbal, beam, and attachment structures to improve dynamic performance of the HSA, decrease pitch and roll stiffnesses, increase lateral and in plane stiffnesses, improve manufacturability, and improve head bond location.

Conventionally available magnetic head suspension assemblies for rigid disk drives allow magnetic read write heads to pitch about a first axis and roll about a second axis orthogonal to the first axis when imperfections in the disk drive assembly tend to place the heads in improper positions. The present invention is designed to allow significant reductions in the pitch and roll stiffness of the head suspension assembly, thus allowing the heads to easily maintain proper attitude. At the same time, the present invention is designed to increase the stiffness in the direction of rotation to maintain proper head position with respect to the suspension assembly. Further, the invention is designed to resist permanent distortion caused by forces in all directions.

Conventional head suspension assemblies consist of a head support baseplate, load beam, and flexure which are usually etched, stamped and then welded together. The present invention is designed to allow the flexure and/or the baseplate to be an integral part of the load beam, which reduces manufacturing steps and improves the ability to manufacture the head suspension with the proper head position and attitude.

Conventional head suspension attachments or base plates are welded to the load beam and attached to an actuator arm and are generally configured for swage or screw attachment. The present invention allows the attachment to be an integral part of the load beam and not welded, which reduces process steps, eases disk drive assembly, and improves the ability to position the head properly with respect to the actuator arm. The present invention attaches to the actuator arm by an attachment means employing an interference fit such as a clip.

Another embodiment of the present invention is designed to attach the load beam to the actuator arm by a shrink fit interference means encircling the arm and load beam(s). Such a shrink fit could be performed by heating the attachment means to expand and then contract or heating the attachment to simply contract it around the arm and load beam(s), which reduces the number of components and process steps and allows the head suspension assembly to be attached and removed from the actuator arm easily.

Conventional means for positioning and aligning the read write head to the suspension assembly when attaching the head suspension assembly to the actuator arm when attaching it to place a pin through a hole in the load beam, a pin through a hole(s) in the baseplate, and mount the baseplate on the arm with screws or with the baseplate boss. The present invention is designed to improve the accuracy and ease of positioning the head with respect to the suspension assembly and to facilitate the alignment of the head suspension assembly with respect to the actuator arm by using a pin through a hole in the load beam and a pin through a slot at the base end. The pin/hole registration will keep the part aligned in the x and y directions while the pin/slot registration keeps the part from rotating about the z axis. Further, a unitary suspension piece eliminates the tolerance build up from welding three components together and allows the head location to depend solely on the precision manufacture of the holes and slots.

Conventionally available magnetic head suspension assemblies have load beams with rails formed away from the rigid disk or toward the rigid disk, as shown in commonly assigned application Ser. No. 07/583,048 and with a form line that is generally parallel to the disk surface.

In the prior art, the conventional rail formed to project from the surface of the load beam which is oriented away from the disk offered increased clearance between the disk and the load beam for lifting the load beam, while the conventional rail oriented toward the disk surface offered increased clearance between two back to back head suspension assemblies and allows for closer disk spacing. The present invention is designed to offer increased clearance on both sides of the head suspension assembly for lifting the load beam and allowing closer disk spacing. The invention uses a rail form line that is not parallel to the disk surface but is closer to the disk at the slider end and away from the disk at the base end such that the lift clearance can be maximized near the base and the disk spacing clearance can be maximized near the slider.

BRIEF DESCRIPTION OF THE INVENTION

The magnetic head suspension assembly of the present invention overcomes the limitations of the prior art by making the load beam and flexure from the same piece of sheet material. In so doing the accuracy of orientation of the flexure in relation to the load beam is carefully controlled and the overall structure can be optimized to improve its dynamic characteristics and greatly reduce its size.

More specifically, the suspension assembly of the present invention includes a spring load beam element portion joined to the arm at a proximal end thereof; a unitary flexure portion projecting beyond the distal apex of the element, the flexure portion being divided into a head support area constructed and arranged for receiving a disk drive head to be bonded thereto; and at least two flexible arms defined by slots in the surface of the flexure portion where the slots also define a perimeter of the head support and where each of the arms generally encloses at least a portion of the perimeter of the head support and each of the flexible arms is constructed and arranged for flexible suspension of the head support.

It is an object of the present invention to provide an improved magnetic head suspension having a unitary load beam and flexure structure.

It is also an object of the present invention to provide a flexure having reduced flexure pitch and roll stiffness and increased lateral or rotary stiffness Another object of the present invention is to provide a head suspension and actuator arm attachment that fixes the load beam to the actuator arm and is easy to attach, easy to rework, and can reduce manufacturing costs.

A further object of the present invention is to provide a load beam with increased clearance between itself and the rigid disk, increased clearance on the opposing side to reduce disk spacing or total rigid disk drive spacing, improved resonance, and lowered spring rate.

A still further object of the present invention is to provide locating aids or tooling indices to more accurately locate the read write head with respect to the suspension assembly and the suspension assembly and read write head more accurately with respect to the actuator arm.

These and other objects of the present invention will be apparent with reference to the drawings, the description of the preferred embodiment, and the claims.

DESCRIPTION OF THE PREFERRED EMBODIMENT

Figure 1:
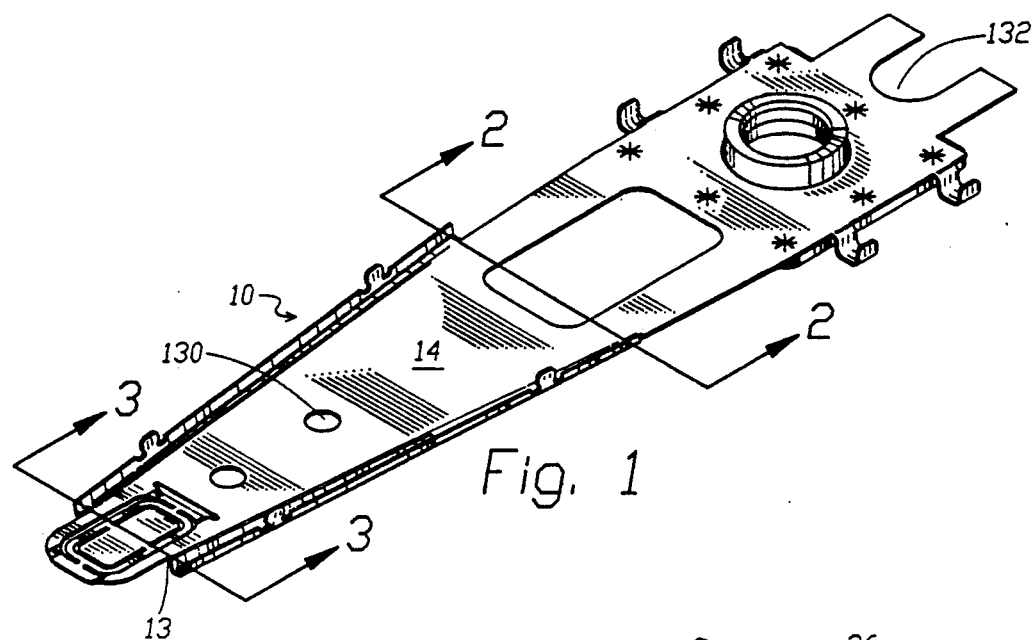
FIG. 1 is a top perspective view of the magnetic head suspension in accordance with this invention.

The improved flexure and load beam structure 10 for use in an improved magnetic head suspension which is illustrated in FIGS. 1-4, consists of a head support baseplate means or central head support area 12 which projects beyond a distal apex 13 of a spring load beam element 14. The head support area 12 is where the slider, the element which supports the read-write head, is to be bonded to the flexure.

Load beam element 14 has provisions at its proximal end 15 for attachment to a disk drive rigid actuator arm which is not illustrated. In the embodiment shown in FIG. 1, a swaging boss 16 is provided for forming a swaged connection to an actuator arm or E-Block utilizing well known swaging techniques. Alternatively, load beam element 14 may be secured to the arm using bolts, any other commonly used attachment means or the improved attachment means disclosed in FIGS. 7 and 8 and discussed below.

In the preferred embodiment shown in FIGS. 1 through 4, the head support means 12 is formed integrally with the flexure and load beam structure 10 rather than being formed as a separate structure which is then welded to the load beam as shown, for example, in the prior art Watrous patent and a number of subsequent patents. In the preferred embodiment according to the present invention, the integral flexure structure is formed by etching a number of apertures or slots 18, 20, 22, 24 in the vicinity of the distal apex 13 of the load beam element 14 in order to form a plurality of flexible arms 26 and 28 which provide low stiffness in the pitch and roll axes to allow head support means 12 to move freely about those axes while providing high translational stiffness to keep the head mounted on head support means 12 from moving side to side or front to back as the actuator moves the slider across the face of the disc.

Figure 4:
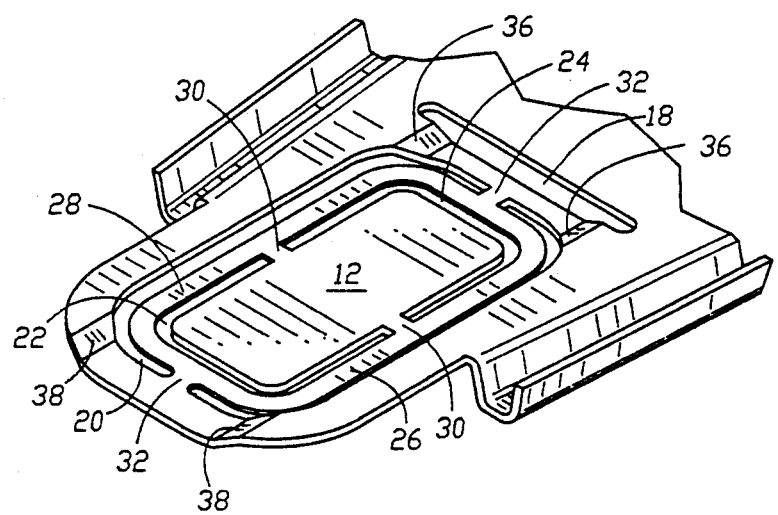
FIG. 4 is a top perspective detail view of the flexure portion of the suspension in FIG. 1.
Figure 2:
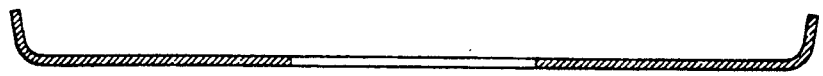
FIG. 2 is a sectional view of the load beam in FIG. 1 with the sectional through the rails near the spring area.
Figure 3:
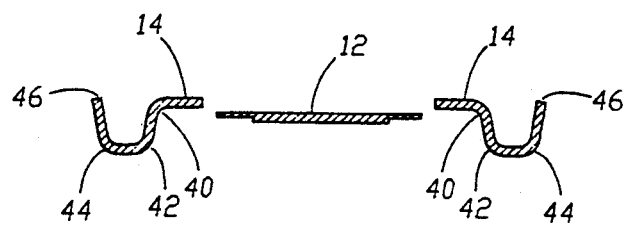
FIG. 3 is a sectional view of the distal end of the assembly in FIG. 1 with the section taken through the flexure which is an integral part of the load beam.

Referring to the detail shown in FIG. 4 of the flexure portion of load beam element 14, it can be seen that slots 22 and 24 which enclose at least a portion of the perimeter of head support means 12 leave only connecting arms 30 between the edges of head support means 12 and the remainder of the flexure and load beam structure 10 such that the head support means is relatively freely pivotable about a first axis drawn through the arms 30 which connect head support means 12 to flexible arms 26 and 28 which are themselves interconnected to the body of load beam element 14 by connecting arms 32 which, when interconnected by a second axis drawn through them, suspend head support means 12 and flexible arms 26 and 28 about the second axis which is orthogonal to the first axis. The first axis can generally be referred to as a pitch axis while the second axis can be referred to as a roll axis. As shown specifically in the detail in FIG. 4, it can be seen that offsets 36 and 38 are formed in the surface of the flexure portion of the spring load beam element 14 to provide clearance for a head mounted on the head support means by vertically adjusting its position relative to the surface of spring load beam element 14. Offsets 36 and 38 can be formed by either etching, stamping or similar processes. The cross-sectional view of the central head support area 12 shown in FIG. 3 illustrates that head support means 12 is depressed below the surface of load beam element 14 by an offset h1. FIG. 3 also illustrates that the head support means 12 can be etched to make it thinner to reduce its weight and also change its dynamic characteristics.

By forming the flexure as an integral part of load beam 14, the error build-up which arises from the process of mounting a separate flexure portion on the load beam element is eliminated. The partial etching to thin areas of the flexure such as the flexible arms allows for the achievement of lower pitch and roll stiffnesses while maintaining standard strength characteristics in the remainder of the integral load beam 14.

Also illustrated in FIGS. 1 through 4 is a stiffening rail structure which differs substantially from load beam reinforcement arrangements normally found in prior art slider suspensions. At the distal apex of the suspension, it can be seen that the edge of the load beam is bent downwardly about a first radius 40 and then bent about radii 42 and 44 to form a channel which has its edge 46 terminate generally in the plane of the surface of load beam element 14 as can be clearly seen in FIG. 3.

The channels at the edges of load beam 14 have a depth h2 at the distal end of load beam element 14. The depth decreases along the length of the load beam moving toward the proximal end until there is no offset h1 of the bottom of the channel from the surface of load beam 14 at the point where the rails terminate in the vicinity of section line 2 as shown in FIG. 1. Thus the channels along the sides of the load beam element 14 are level with the surface of load beam 14 at a point approaching the distal end of the load beam and the bottom of the channels are level with the flat area at the proximal end of the channel. The rail arrangement provides increased loading clearance for a suspension by minimizing the height at the distal end and allowing increased disc to suspension clearance at the proximal end to facilitate lifting of the head slider and proximal end of the load beam to displace the head from the surface of the disc.

Figure 5:
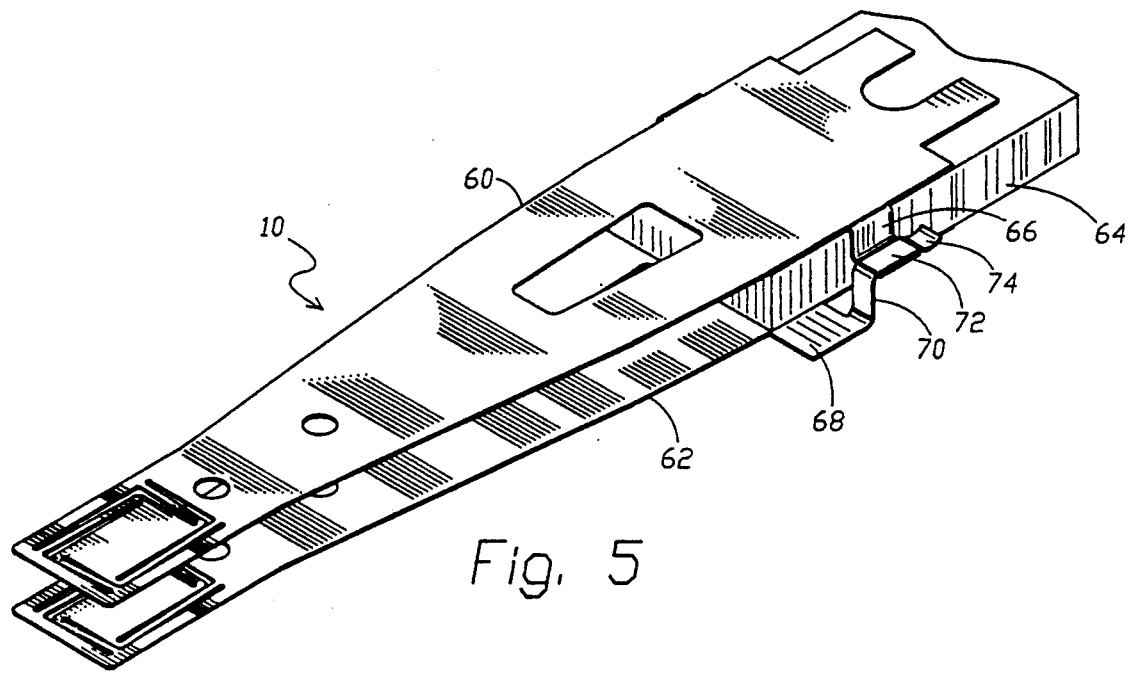
FIG. 5 is a top perspective view of another magnetic head suspension assembly in accordance with this invention.

FIG. 5 shows a further embodiment of the present invention. The flexure and load beam structure 10 is divided into an upper load beam element 60 and a lower load beam element 62 which are positioned for engaging the top and bottom surfaces of an actuator arm 64. As shown in FIG. 5, a projecting attachment means 66 from the upper load beam element 60 interfaces with a cooperating attachment means 68 projecting from the side of lower load beam element 62. Upper attachment means 66 is L-shaped and provides for a spring-loaded interface with lower attachment means 68 which projects outwardly from the surface of lower load beam element 62 and has a vertically projecting tab 70 which has a horizontal projection 72 which engages the attachment means 66 connected to upper load beam element 60. Finally, a latch segment 74 is formed by forming a large radius detent in the portion of element 72 from its distal terminus to a point slightly beyond the width of the tab of L-shaped upper attachment means 66 to make a positive detent fit when the attachment means 66 and 68 are pushed together as the suspension is assembled to the actuator arm 64.

At the proximal end of the two-piece suspension shown in FIG. 5, an integral flexure is again illustrated. The central head support area or head support means 76 is shown. The perimeter of head support means 76 is defined by slot 78 and 80. Additional slots 82 and 84 serve to define elongated, bent flexible arms 86 and 88 which extend from a point 90 at the main body of load beam 60 and extend along the perimeter of head support means 76 bend at approximately a right angle at point 92 and then intersect with a corner of the head support means 76. In the same manner, flexible arms 94 also project from the main body of the load beam element 60 and join opposite adjacent corners of head support means 76 to provide for gimbal support of the head support means 76. Again, the head support means 76 is freely movable in the pitch and roll rotational axes while providing high translational stiffness to keep the head from moving from side to side or front to back.

Figure 6:
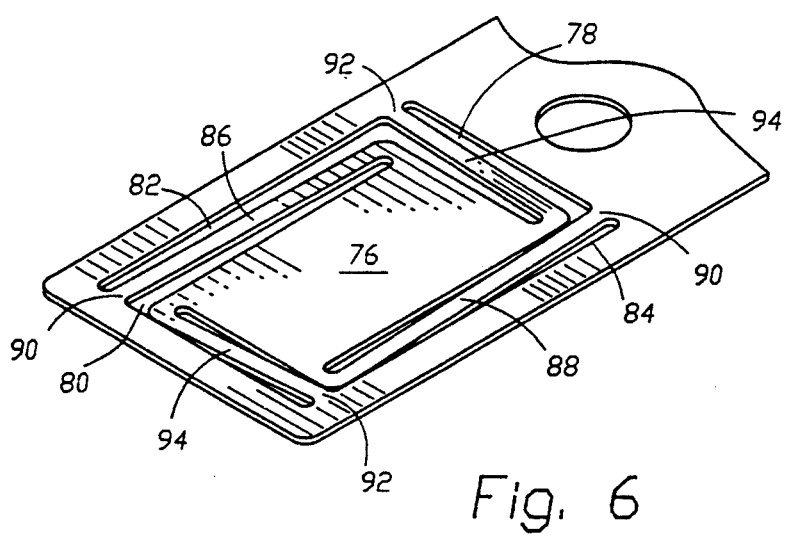
FIG. 6 is a top perspective detail view of the flexure portion of the suspension assembly in FIG. 5.

Although one form of slot pattern for forming the flexible arms and central head support means as shown in FIGS. 1 through 4 and a different form is shown for the two-piece suspension shown in FIGS. 5 and 6, the arrangements are, in fact, interchangeable and the embodiment of the etching pattern shown in FIGS. 5 and 6 can be used on the single piece suspension shown in FIGS. 1 through 4 or the etching pattern shown in FIGS. 1 through 4 can equally well be used on the two-piece suspension illustrated in FIGS. 5 and 6.

Figure 7:
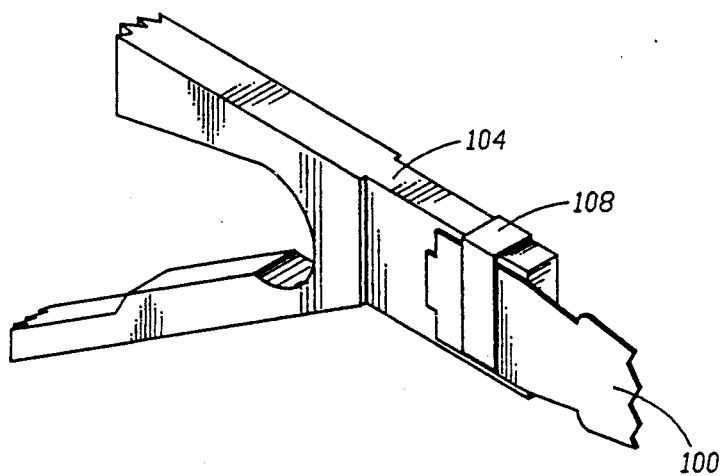
FIG. 7 is a top perspective view of a load beam to actuator arm attachment that is in accordance with this invention.

As alternatives to the swaged attachment of the load beam to the actuator arm illustrated in the embodiment shown in FIGS. 1 through 4 and the integral attachment means shown in the embodiment shown in FIGS. 5 and 6, FIGS. 7 and 8 show two alternative attachment means for connecting load beams 100 and 102 respectively to actuator arms 104 and 106 respectively. In FIG. 7, a C-shaped clip 108 slides over and urges load beam 100 into attachment with actuator 104. The clip 108 can be welded to load beam 100 before mounting or can be formed as an integral part of the load beam.

Figure 8:
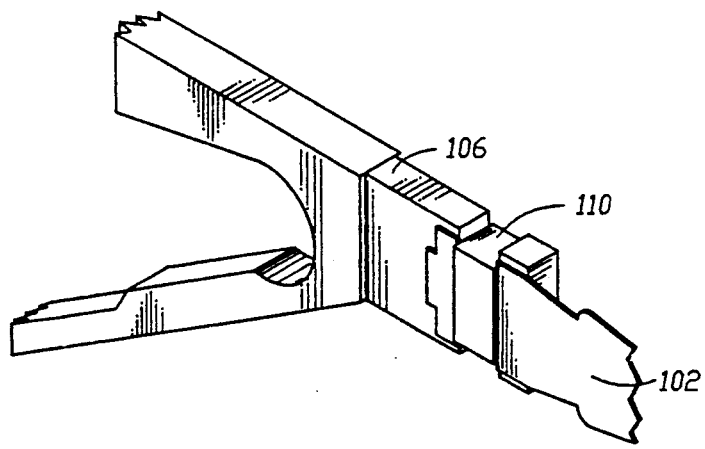
FIG. 8 is a perspective view of another load beam to actuator attachment concept that is in accordance with this invention.

In FIG. 8, a band 110 is wrapped around an actuator arm 106 sandwiching either a single piece load beam structure 102 as shown or upper and lower structures of the type shown in FIGS. 5 and 6. Band 110 must be larger than the total circumference of the actuator arm 106 and the load beam 102 when slipped in place and is then shrunk down to create an interference fit between the arm and load beams. If formed from memory metal, the band is heated to expand it for fitting and then allowed to contract. The band can also be made from plastic or similar material which is heated and caused to shrink and permanently deform to secure the load beam 102 to actuator arm 106.

Conventional means for positioning and aligning the slider with respect to the head support base plate included the insertion of tooling pins through a first hole in the flat portion of the load beam and through a second hole in the base portion of the load beam in the vicinity of the swaging boss. Since the location of the slider using that arrangement was dependant on tolerances between the flexure and load beam, load beam and base plate, manufacture of the base plate, and manufacture of the flexure; the location of the slider was not as accurate as required for some applications. One other prior art locating concept consists of inserting tooling pins through a hole and slot which are located in the load beam flat area. Because the distance between the hole and slots as used in prior art devices was small, the location accuracy was not sufficient for all purposes.

The improved fixturing or locating system according to the present invention consists of a first tooling pin through a hole 130 in the load beam very near the flexure and a second tooling pin through a slot 132 in the load beam at the very end opposite the flexure. With the hole and slot being substantially displaced from each other, and the flexure integrated into the load beam, locating tolerances are much improved.

Prior art location of sliders with respect to each other in an actuator stack was determined by a pin through each hole in their respective load beams. The improved fixturing system usable with the unitary load beam and flexure structure has a hole 120 (FIG. 8) very near the flexure to minimize misalignment of sliders mounted on the flexure baseplates.

What is claimed is:

1. In a magnetic disk drive having a magnetic head suspension for supporting a magnetic head at a fixed distance from an actuator arm, said suspension including a flexure and load beam, an improved attachment means for affixing a load beam to a rigid arm, said attachment means comprising: a band of shrinkable material which at least partially encircles the rigid arm and a proximal portion of the load beam and is shrunk into place after positioning thereby affixing the load beam to the rigid arm.

2. The attachment in claim 1 wherein the head suspension has upper and lower load beam portions attached to opposite faces of the actuator arm.

3. The attachment in claim 1 wherein the material is memory metal.

4. The attachment in claim 1 wherein the material is plastic or some similar material that shrinks at elevated temperatures and retains a shrunken condition when the temperatures is returned to ambient conditions.

5. A method for securing a proximal end of a load beam to an actuator arm comprising the steps of:
   positioning the proximal end of the load beam and an actuator arm in the desired position;
   at least partially encircling the actuator arm and load beam with a band of shrinkable material; and
   shrinking the band of material to affix the load beam to the arm.

6. A method for using locating tooling with respect to a head suspension assembly for rigid disk drives that has a load beam with a slot at a proximal end and a hole near a distal end, said method comprising the steps of placing a first locating pin in said hole to keep the suspension from translating in x and y directions, placing a second locating pin in the slot to keep the suspension from rotating about a z direction where the slot is placed at a proximal end of the suspension to maximize a distance between the said slot and said hole thereby minimizing undesired movement of the suspension.

7. The system in claim 6 wherein there are more than one hole in the load beam.

8. A suspension load beam for a rigid disk drive, said load beam comprising a generally flat central load beam area having channels with upstanding walls disposed along sides of said flat area wherein tops of the channels are level with the flat area at a load beam distal end and bottoms of the channels are level with the flat area at a proximal end such that the distal end provides increased loading clearance and the proximal end provides increased disk to suspension clearance thereby facilitating lifting of the proximal end of the beam.

9. The suspension load beam in claim 8 wherein the channels are parallel to each other.

* * * * *